Nov. 7, 1944.    L. R. DAVIS    2,362,361
AIRCRAFT
Filed Dec. 17, 1943    3 Sheets-Sheet 1

INVENTOR
Loren Russell Davis
BY
Beau, Brooks, Buckley & Beau.
ATTORNEYS

Nov. 7, 1944.  L. R. DAVIS  2,362,361
AIRCRAFT
Filed Dec. 17, 1943.  3 Sheets-Sheet 2

INVENTOR
Loren Russell Davis
BY
ATTORNEYS

Nov. 7, 1944.  L. R. DAVIS  2,362,361
AIRCRAFT
Filed Dec. 17, 1943  3 Sheets-Sheet 3
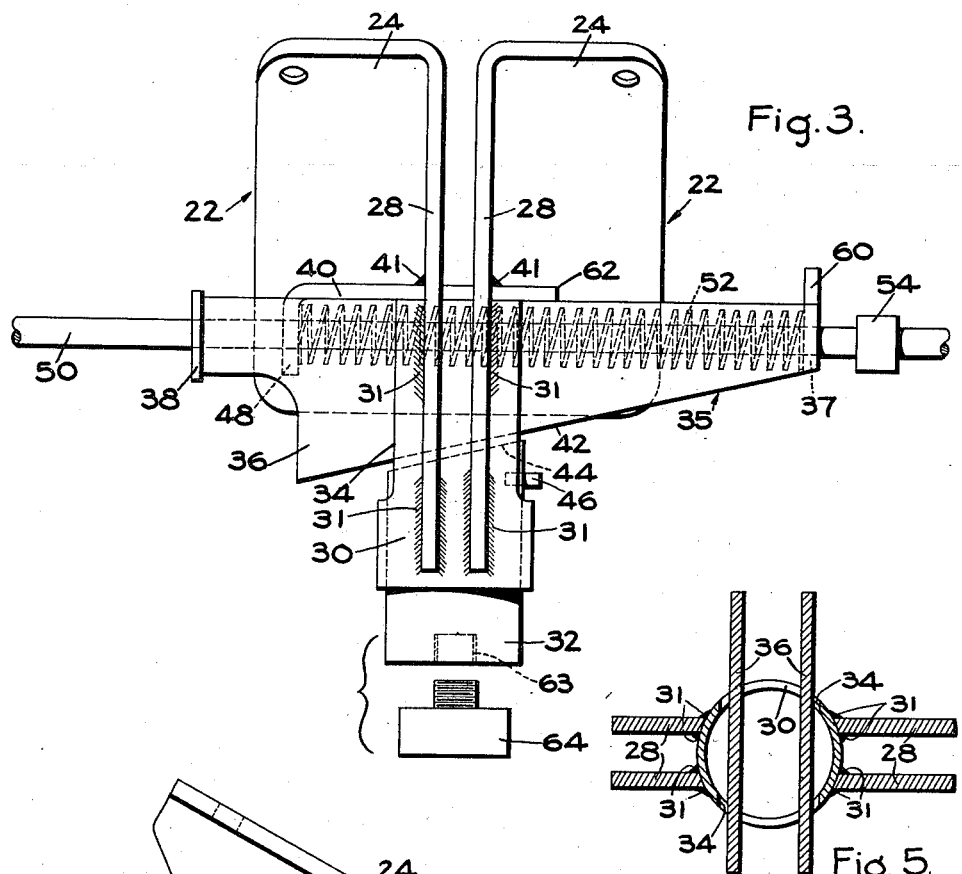
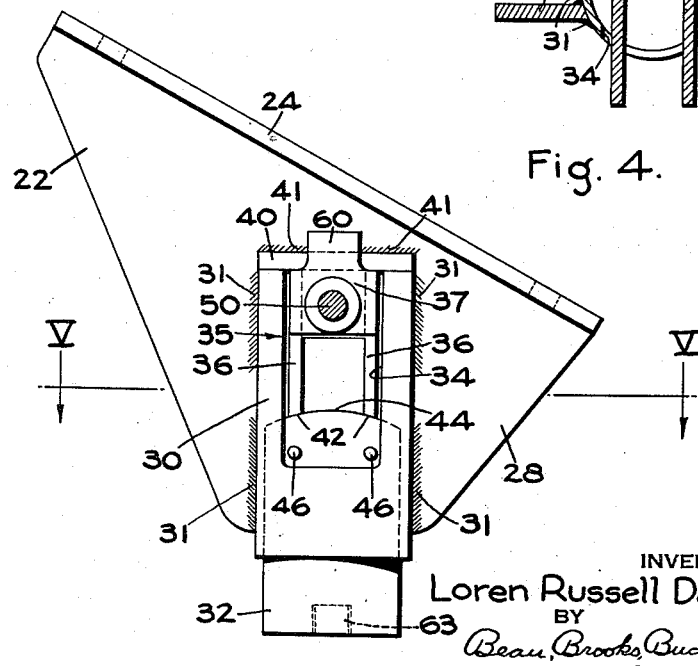
INVENTOR
Loren Russell Davis
BY
Bean, Brooks, Buckley & Bean
ATTORNEYS Patented Nov. 7, 1944

2,362,361

UNITED STATES PATENT OFFICE 2,362,361

AIRCRAFT

Loren Russell Davis, Newtown, Pa., assignor to Brewster Aeronautical Corporation, Hatboro, Pa.

Application December 17, 1943, Serial No. 514,631

10 Claims. (Cl. 89—1.5)

This invention relates to aircraft bomb carriers, and more particularly to improvements in bomb chocking devices to be carried by aircraft or the like for positioning the bomb loads thereof in improved manner.

One of the objects of the invention is to provide an improved bomb chocking device which tends automatically to adjust itself into firm bomb-chocking condition, and yet is adapted to be manually retracted with improved facility away from interfering position during bomb rack loading operations. Another object of the invention is to provide an improved chocking device for the purpose described which is self-adjustable and automatically operable to adjust itself quickly into firm bomb-chocking position relative to variously sized bombs or the like, thereby eliminating the time and trouble usually required in connection with manual adjustments for such purposes of chocking devices of the prior art. Another object of the invention is to provide an improved chocking device of the character described which is automatically self locking in bomb chocking position, whereby it is adapted to successfully resist tendencies of the chocking device to retract in response to forces imposed thereon by the bomb load. Another object of the invention is to provide a chocking device of the features and characteristics aforesaid which is also of simplified structural form and relatively light weight and extremely rugged and fool-proof in its operation. Other objects and advantages of the invention will appear from the specification hereinafter.

In the drawings:

Fig. 3 is a side elevation, on an enlarged scale, of a chocking device of the invention;

Fig. 4 is a front elevation thereof; and

Fig. 5 is a section taken along line V—V of Fig. 4.

Figure 1:
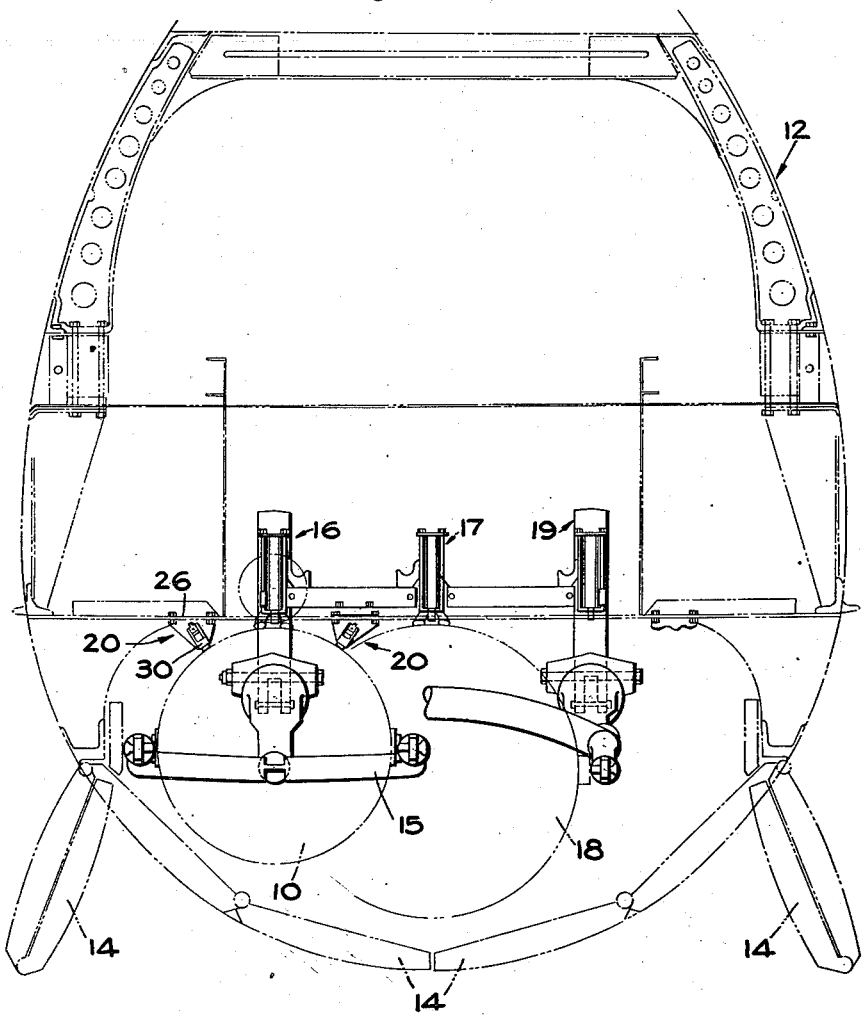
Fig. 1 is a front elevation of a bomb rack and chocking arrangement of the invention, shown in conjunction with the bomb load of an airplane.

The drawings illustrate application of chocking devices of the invention to a bomb 10 carried within the bomb-bay portion of an airplane fuselage which is designated generally at 12. The bomb-bay folding doors are indicated at 14, and a pivotable displacement bracket 15 is shown in conjunction with the bomb 10 for forcibly projecting the latter outwardly of the bomb-bay opening upon release of the bomb from the rack, as in connection with dive bombing tactics or the like. The bomb rack for detachably locking the bomb 10 in carrying position is indicated generally at 16; and it will be understood that any suitable type of bomb rack mechanism may be employed in conjunction with chocking devices of the present invention for maintaining the bomb load in accurately and firmly positioned relation upon the aircraft prior to dispensing of the bomb load. In Fig. 1 the bomb rack mechanism includes a second shackle device 17 adapted to hold a large bomb 18, and a third shackle 19 adapted to hold a second bomb of the size of the bomb 10, whereby it will be understood that any desired bomb load arrangement may be carried.

Figure 2:
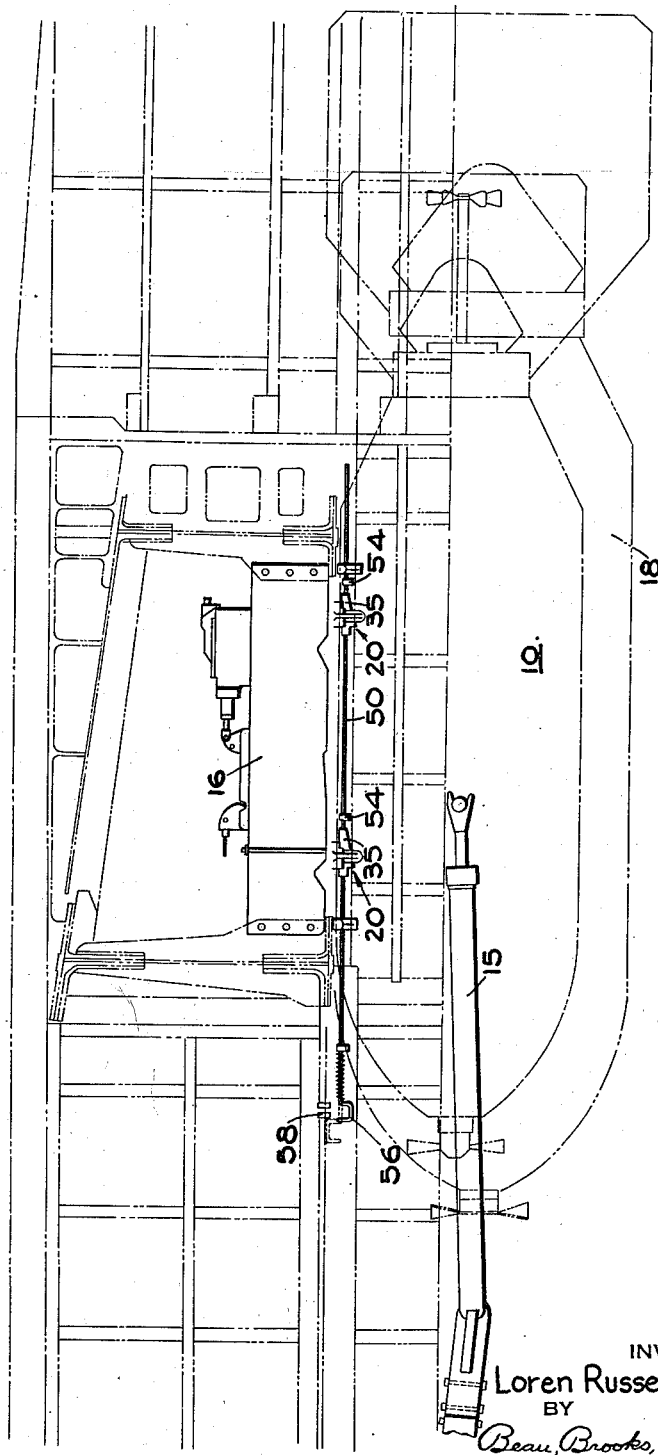
Fig. 2 is a side elevation thereof.

In Figs. 1-2 chocking devices of the invention are indicated at 20 to be positioned in longitudinally spaced pairs at opposite sides of the bomb rack 16 and fore and aft of the hook thereof whereby to exert pressures against the bomb 10 at four relatively widely spaced positions thereon to cooperate with the vertical pull of the bomb rack upon the bomb hook eye, whereby to hold the bomb firmly in the airplane. It will be understood however that the chocking devices may be grouped in any other desired arrangement relative to the rack 16 and to the bomb; and that the chock devices of the invention are equally applicable for use in conjunction with dive-bombing or level bombing gear.

As illustrated more clearly in Figs. 3-4, the chock device of the invention comprises a structurally simple mechanism which is adapted to be fabricated easily and inexpensively. Each chock 20 comprises a bracket member consisting of a pair of oppositely flanged plates 22—22 having directionally aligned face portions 24—24 thereof adapted to be clamped against any suitable stationary bracket portion of the airplane, such as at 26 in Fig. 1. Depending from the face portions 24—24 of the plates 22—22 are web portions 28—28 arranged in spaced parallel relation. A sleeve 30 longitudinally slotted and slip-fitted upon the web portions 28—28 partially encloses the latter; and the sleeve 30 is welded or otherwise fixed to the plates as indicated at 31—31 so as to unite the plates 22—22 and the sleeve 30 into the form of a structurally integral unit. Inasmuch as the mounting bracket 26 of the airplane structure is illustrated to be disposed in a horizontal attitude and the pressure forces to be exerted by the chock device against the bomb 10 are to be directed obliquely, the sleeve 30 is shown in the drawings as being mounted to extend obliquely relative to the plane of the bearing faces 24—24 of the mounting plates. Thus, it will be understood that the angle of extension of the sleeve 30 relative to the bearing faces 24—24 will in every case depend upon the dimensional proportions and relative arrangements of the bomb load and the chock mounting devices.

A chocking ram 32 of piston-like form is slidably mounted within the sleeve 30 for free movement telescopically thereof, and the ram 32 is so proportioned and arranged as to extend at its lower end beyond the sleeve 30 to press against the bomb load at the designated position thereof for steadying the bomb load in its mount. The sleeve 30 is transversely slotted as indicated at 34 at opposite sides thereof, and the plate web portions 28—28 are slotted in alignment therewith so as to adapt the bracket-sleeve unit to receive in transversely inserted relation therethrough a wedge device 35. The wedge 35 is formed of sheet metal bent to provide a pair of spaced side wall or leg portions 36—36 joined at their forward ends by means of an end wall 37 and at their rear ends by an end wall 38. The upper surface portions of the walls 36—36 are horizontally aligned; and a bearing plate 40 is inserted through the apertured portions of the bracket webs 28—28 and is welded or otherwise fixed thereto as at 41—41 to provide a horizontally disposed bearing surface against which the upper wall portions of the wedge device 35 may slide in lateral directions as viewed in Fig. 3.

The lower face portions of the wedge walls 36—36 are sloped in relative synchronism to provide a pair of camming faces 42—42 arranged to bear down upon the top end portion 44 of the ram 32. Thus, it will be understood that upon movement of the wedge device 35 toward the right as viewed in Fig. 3, relative to the mounting bracket device, the ram 32 will be thereby forced downwardly so as to project beyond the sleeve 30 for pressing the bomb load into firmly chocked position. Retraction of the wedge device 35 toward the left as viewed in Fig. 3 will release the ram 32 so as to be free to be retracted into the sleeve 30, whereby interference with mounting a new bomb upon the shackle 16 will be avoided. A pair of pins 46—46 are arranged to fixedly extend from the upper body portion of the ram 32 through the apertured portion 34 of the sleeve 30, and the pins 46—46 are so positioned as to be adapted to prevent the ram 32 from rotating within the sleeve 30 and also from falling free of the sleeve 30 when no bomb is mounted in the rack.

The bearing plate 40 is provided with a downturned end portion 48 (Fig. 3) which is apertured to slidably carry a control rod 50 inserted therethrough. The end plate portions 37—38 of the wedge device 35 are similarly apertured to permit the control rod 50 to be threaded therethrough in free sliding relation. A compression spring 52 is mounted about the control rod 50 between the positions of the end plate 37 and the flange portion 48 of the bearing plate 40; and the spring 52 is so provided as to press at its opposite ends against the plate 37 and the flange 48 whereby to bias the wedge device 35 toward the right as viewed in Fig. 3, or toward its furthermost chocking position. The slopes of the cam faces 42—42 of the wedge device are arranged to be relatively flat as shown in the drawings, whereby forces transmitted through the bomb load tending to drive the ram 32 inwardly of the sleeve 30 are effectively blocked by the wedge device at any position of adjustment thereof.

Thus, it will be understood the forces of the spring 52 will bias the wedge 35 into ram-driving position, whereby the ram 32 will be forced to bear firmly against the mounted bomb in such manner as to cooperate with similarly operating ram devices of the other chock units to firmly lock the bomb in carrying position. Upon release of the bomb shackle 16, however, the bomb will be free to drop clear of the carrying mechanism, and the pins 46—46 will thereupon prevent the chock rams 32 from falling out of their sleeves 30.

A control rod 50 of the character illustrated may be provided to actuate in tandem the longitudinally aligned ram wedges of a plurality of chock devices at corresponding sides of the bomb load. For such purpose each rod 50 is provided with a suitable number of fixed abutment devices 54 adapted to be brought to bear against the corresponding wedge end plate 37 by manual pulling of the control rod to the left as viewed in Figs. 2-3. Such pulling of the control rods will draw the wedge devices 35 into retracted position against the forces of the springs 52. Preferably, the control bars 50 will each be provided at one end thereof as illustrated in Fig. 2 with a bent handle portion 56 adapted to be rotated when the rod is in wedge-retracted position into abutting relation behind a corresponding stop bracket 58 carried by the aircraft fuselage. Thus, the control bars 50 may be pulled to the left as viewed in Figs. 2-3 for retraction of the wedge devices 35, and then rotated as to the broken line position thereof shown in Fig. 2 so as to register behind the stop 58, for locking of the wedges 35 in inoperative positions. A bomb may thereupon be loaded into the aircraft and hooked upon the bomb rack 16 without interference by the bomb chocking devices. The handle portions 56 of the control bars 50 may then be rotated out of registry with the fixed stops 58, whereupon the springs 52 of the chock devices will force the wedges 35 thereof to move to the right and into ram driving positions, whereby the chock devices will automatically lock the bomb in firmly mounted relation upon the aircraft. If preferred, the rods 50—50 at opposite sides of the bomb may be interconnected by any suitable linkage whereby control thereof may be effected through manipulation of a single control device.

The end plate portion 37 of the wedge device 35 is formed to extend vertically as indicated at 60 into registry with the end portion 62 of the bearing plate 40 to limit the extent of release motion of the control rod 50, as may be desired. As illustrated in Fig. 3, the ram 32 may be bored and tapped as indicated at 63 so as to be adapted to receive in screw-threaded relation thereon a similarly threaded stub portion of a ram supplement member 64, whereby the effective length of the chock ram may be extended as may be required to suit the chock device to different size bombs, without disassembly of the ram and sleeve unit.

Thus, it will be appreciated that the invention provides a bomb chock device which is automatically operable in response to ever-present spring forces to ram the associated bomb load into firmly mounted position, and to thereupon maintain the bomb load with unyielding thrust forces against accidental displacement therefrom, despite the fact that the wedge operating means of the mechanism comprises resilient spring means. It will also be understood that another important feature of the invention is that a single control rod may be employed to simultaneously actuate a plurality of such chocking devices; and that although the chocking mechanisms are extremely rugged and automatically resistant against accidental bomb displacement forces they are adapted to be fabricated so as to be extremely light-weight and inexpensive to manufacture. In this respect it will be appreciated that the chocking devices of the invention are particularly adapted to be constructed almost entirely of sheet metal stamped and bent and welded or otherwise fabricated, as may be preferred.

I claim:

1. In an aircraft, a bomb chock device comprising a mounting bracket, a sleeve fixed to said bracket to extend therefrom in the direction of the bomb to be chocked, a ram slidably mounted within said sleeve, a slide track carried by said bracket, a wedge carried by said slide track to bear against said ram for displacing the latter relative to said carrying sleeve in response to movements of said wedge in directions transverse to the direction of movement of said ram, elastic force means carried by said bracket and coupled to said wedge to bias the latter toward ram projected position, and manual control means connected to said wedge for retracting the latter against the forces of said elastic force means to release said ram.

2. A bomb chock device comprising a sleeve adapted to be mounted to extend in the direction of the bomb to be chocked, a ram slidably mounted within said sleeve, a slide track carried by said sleeve, a wedge carried by said track to bear against said ram for displacing the latter relative to said sleeve in response to movements of said wedge in directions transverse to the direction of movement of said ram, and elastic force means coupled to said wedge to bias the latter toward ram projected position.

3. In an aircraft, in combination, a plurality of bomb chock devices each comprising a mounting bracket fixed to stationary structure of the aircraft, a guide device fixed to said bracket to extend obliquely therefrom in the direction of the bomb to be chocked, a ram slidably mounted within said guide device, a slide track carried by said bracket, a wedge carried by said slide track to bear against said ram for displacing the latter relative to said guide device in response to movements of said wedge in directions transverse to the direction of movement of said ram, spring means coupled to said wedge to bias the latter toward ram projected position, and manual control means connected to a plurality of directionally aligned of said wedge members for retracting the latter against the forces of said spring means to release the corresponding rams from bomb chocking operation.

4. In an aircraft, in combination, a bomb shackle, a plurality of bomb chock devices grouped about said shackle and each comprising a mounting bracket supporting said device to stationary structure of the aircraft, each of said brackets having a slideway portion extending therefrom in the direction of the bomb to be chocked, a ram slidably mounted upon said slideway, track means carried by said bracket, a wedge device carried by said track means to bear against said ram for displacing the latter relative to said slideway in response to movements of said wedge device in directions transverse to the direction of movement of said ram, elastic force means coupled to said wedge device to bias the latter toward ram projected position, means connected to a plurality of said wedge devices and adapted to be actuated for retracting the wedge devices against the forces of said elastic force means to release said rams.

5. In an aircraft, a bomb chock device comprising a mounting bracket, a tubular sleeve fixed to said bracket to extend therefrom in the direction of the bomb to be chocked, a cylindrical ram slidably mounted within said sleeve, said sleeve being transversely slotted to provide a slideway therethrough, a wedge carried by said slideway to bear against said ram for displacing the latter relative to said sleeve in response to movements of said wedge in directions transverse to the direction of movement of said ram, abutment means extending from said ram into a slotted portion of said sleeve for preventing rotation of said ram interiorly of said sleeve and disassembly movement of said ram relative to said sleeve, and elastic force means coupled to said wedge to bias the latter toward ram projecting position.

6. A bomb chock device comprising a sleeve adapted to be mounted to extend in the direction of the bomb to be chocked, a ram slidably mounted within said sleeve and having a wedge shaped inner end, a slide track carried by said sleeve, a cam carried by said track and having parallel sloping leg portions arranged to bear against said ram at opposite sides of said wedge shaped end portion for displacing the ram relative to said sleeve in response to movements of said cam, and elastic force means coupled to said cam to bias the latter toward ram projecting position.

7. In an aircraft, in combination, a plurality of bomb chock devices each comprising, a mounting bracket fixed to stationary structure of the aircraft, a guide device fixed to said bracket to extend obliquely therefrom in the direction of the bomb to be chocked, a ram slidably mounted within said guide device, a wedge carried by said bracket to bear against said ram for displacing the latter relative to said guide device in response to movements of said wedge, spring means arranged to bias said ram toward bomb-chocking position, and manual control means connected to said wedge members for retracting the latter against the forces of said spring means to release the rams from bomb chocking operation.

8. In an aircraft, in combination, a bomb shackle, a bomb chock device mounted upon said aircraft to be spaced from said shackle and comprising a mounting bracket supporting said device to stationary structure of the aircraft, said bracket having a slideway portion extending therefrom in the direction of the bomb to be chocked, a ram slidably mounted upon said slideway, a wedge device carried by said device to bear against said ram for displacing the latter relative to said slideway, elastic force means coupled to said wedge device to bias the latter toward ram projecting position, and means connected to said wedge device and adapted to be actuated for retracting the latter against the action of said elastic force means to release said ram.

9. In an aircraft, a bomb chock device comprising a mounting bracket, a ram guide fixed to said bracket to extend therefrom in the direction of the bomb to be chocked, a ram slidably mounted within said guide, a wedge track carried by said device to extend transversely of the direction of said ram guide, a relatively flat angled wedge carried by said wedge track to bear against said ram for displacing the latter relative to said guide in response to movements of said wedge in directions transverse to the direction of movement of said ram, elastic force means coupled to said wedge to bias the latter toward ram projecting position, and means connected to said wedge for retracting the latter against the action of said elastic force means to release said ram.

10. A bomb chock device comprising a pair of flanged plates having like faces thereof disposed in parallel spaced relation, the other faces thereof being disposed in co-planar relation for bearing against a support for attachment of the device to a mounting vehicle, a tubular sleeve slotted longitudinally and slip-fitted upon said parallel plate portions and welded thereto to provide an integral plate-sleeve unit, said plates being cut away at positions interiorly of said sleeve, a cylindrical ram mounted within said sleeve to be slidably carried thereby and to extend at one end therefrom for bearing against a bomb to be chocked, said sleeve and said parallel plate portions being apertured transversely of the planes of said parallel plate portions, a slide plate set upon the inner end portion of said sleeve and inserted through apertured portions of said parallel plate faces to extend across the top end of said sleeve and welded to said plates and having a depending flange portion formed at one end of said slide plate, a ram-actuating wedge device formed of sheet metal bent to provide a box-like unit having spaced side portions bearing at their upper edges against said slide plate and terminating in parallel sloping bottom edges arranged to bear against the inner end portion of said ram for camming the latter to move toward bottom chocking position, a compression spring disposed within said wedge device and arranged to press against one end thereof and against said depending flange portion of said slide plate, said spring being so arranged as to tend to bias said wedge device to cam said ram toward bomb chocking position, and manual retraction means comprising a pull member threaded through said spring and apertured end wall portions of said wedge device and said slide plate flange portion and carrying an abutment member adapted to bear against said wedge device for pulling the latter against the action of said spring to release said ram.

LOREN RUSSELL DAVIS.